United States Patent [19]

Pickard et al.

[11] Patent Number: 4,936,625
[45] Date of Patent: Jun. 26, 1990

[54] TAIL GATE LINER

[75] Inventors: George L. Pickard, Beaverton; Bernard L. Robinson, Coleman, both of Mich.; Bruce Caverly, Oshawa, Canada

[73] Assignee: Homestead Products, Inc., Coleman, Mich.

[21] Appl. No.: 315,605

[22] Filed: Feb. 27, 1989

[51] Int. Cl.⁵ .............................................. B60R 13/01
[52] U.S. Cl. .................................. 296/39.2; 296/901; 411/82; 411/171; 52/787
[58] Field of Search ...................... 296/39.1, 39.2, 39.3, 296/901; 105/423; 411/82, 258, 171; 52/177, 309.2, 787

[56] References Cited

U.S. PATENT DOCUMENTS 4,047,749  9/1977  Lambitz et al. ..................... 296/39.2
4,789,574 12/1988  Selvey ............................. 296/39.2 X Primary Examiner—Margaret A. Focarino
Assistant Examiner—Gary C. Hoge
Attorney, Agent, or Firm—Learman & McCulloch

[57] ABSTRACT

A pickup truck tail gate liner has secured thereto one or more attaching members which confront that surface of the tail gate to which the liner is to be applied. The attaching members are premanently or removably secured to the liner and adhesively bonded to the tail gate without necessitating the provision of any holes in the tail gate.

17 Claims, 1 Drawing Sheet

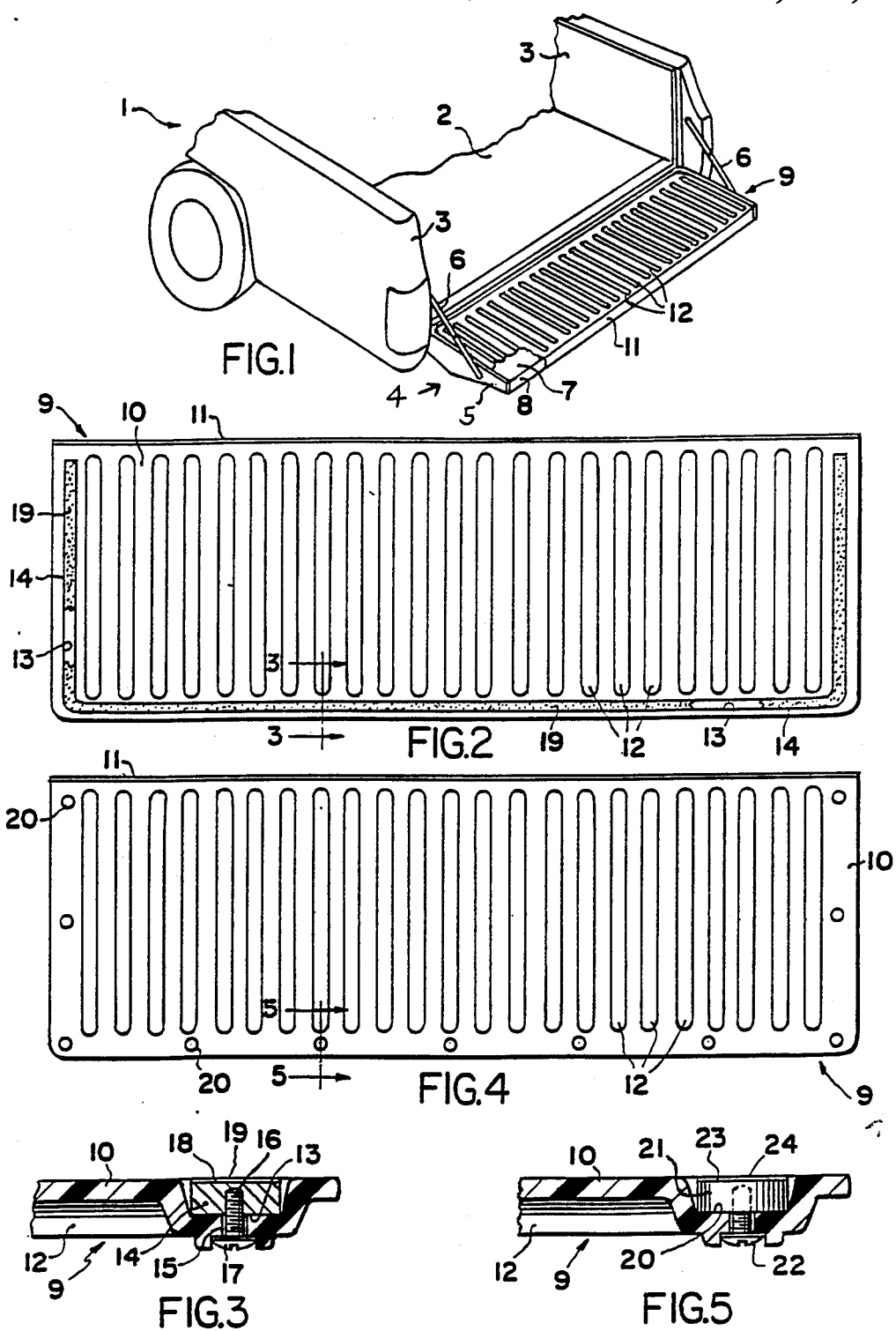

TAIL GATE LINER

This invention relates to a protective liner or cover adapted to be applied to one surface of the tail gate of a pickup truck.

BACKGROUND OF THE INVENTION

The prior art contains many examples of liners for the cargo beds of pickup trucks. Such liners conventionally are formed of a plastic material. Most manufacturers of liners for the cargo beds of pickup trucks also produce a relatively flat liner or panel member that is adapted to be placed in overlying relationship with that surface of the tail gate which is upper-most when the tail gate is in a horizontal position. In all known instances such tail gate liners are secured to the tail gate by screws which extend through holes formed in the liner and are either tapped or drilled into the tail gate itself. The forming of holes in the tail gate itself is objectionable for a number of reasons. For example, the formation of holes makes possible the entry of moisture and dirt into the interior of the tail gate. Such moisture not only can result in rusting of the metal at the edges of the opening, but also exposes the interior of the tail gate to rusting. In many instances the forming of holes in the tail gate will void the vehicle manufacturer's antirust warranty.

An object of the invention is to provide a tail gate liner and apparatus for securing it to the tail gate without having to form any openings in the latter.

SUMMARY OF THE INVENTION

A liner for a pickup truck tail gate has a plastic body or panel of such area and configuration as to overlie and correspond substantially to that surface of the tail gate which is exposed when the tail gate is in a horizontal position. Along one of the longer edges of the liner is a flange or lip which is adapted to overlie that edge of the tail gate which is uppermost when the tail gate is in its upright, locked position.

According to one embodiment of the invention the tail gate has a continuous recess or groove formed therein which extends around all the remaining three sides of the panel and in which is accommodated an attaching member. The attaching member is secured to the liner panel by means of screws or rivets and has one surface which is adapted to confront and bear against the surface of the tail gate. That surface of the attaching member which confronts the tail gate carries a layer of adhesive or cement which will bond securely to the tail gate, thereby securely fastening the liner to the tail gate. Because the attaching member extends around all sides of the liner other than that provided with the flange or lip, the bonding of the attaching member to the tail gate forms a seal which inhibits the entry of moisture and dirt between the liner and the tail gate.

In another embodiment of the invention the liner is like that described earlier, but instead of having a continuous groove around three of its sides, it has a plurality of spaced apart recesses or sockets in each of which is accommodated an attaching member. Each attaching member is anchored in its associated socket by a screw or rivet, and that surface of each attaching member which confronts the tail gate is provided with an adhesive or cement of the kind mentioned above so as to enable each attaching member to be bonded securely to the tail gate.

THE DRAWINGS

A liner constructed in accordance with the invention is disclosed in the accompanying drawings, wherein:

FIG. 1 is a fragmentary, isometric view of a pickup truck tail gate fitted with a liner formed in accordance with one embodiment of the invention;

FIG. 2 is a bottom plan view of the liner shown in FIG. 1;

FIG. 3 is an enlarged sectional view taken on the line 3—3 of FIG. 2;

FIG. 4 is a bottom plan view of a modified embodiment of liner; and

FIG. 5 is an enlarged sectional view taken on the line 5—5 of FIG. 4.

THE PREFERRED EMBODIMENTS

Apparatus constructed in accordance with the invention is adapted for use in conjunction with a pickup truck 1 at the rear of which is a cargo bed 2 having side walls 3. The cargo bed has an open rear end that is adapted to be closed by a tail gate 4 having a body 5 pivoted to the rear end of the cargo bed for swinging movements between a lowered position, as shown in FIG. 1, and a raised position in which the tail gate closes the open end of the cargo bed. Supporting braces 6 may be provided to support the tail gate 4 in a substantially horizontal position. The tail gate has a substantially flat surface 7 which is uppermost when the tail gate is in its open, horizontal position and a free edge 8 which is uppermost when the tail gate is in its raised position. The material from which the tail gate 4 is formed conventionally is steel or other suitable metal, but it also may be formed from other materials such as suitably reinforced fiberglass.

Overlying the surface 7 of the tail gate is a protective liner 9 comprising a panel 10 of such area and configuration as to conform substantially to the area and configuration of the surface 7. The liner is molded in a conventional manner from suitable plastic material. Preferably, the liner 9 includes a laterally projecting flange or lip 11 which overlies the edge 8 of the tail gate. Suitable ribs 12 for reinforcing and decorative purposes may be provided in the panel 10, as is conventional.

The material from which the liner 9 is molded conventionally is polyethylene because of its ability to withstand abusive treatment and its resistance to deterioration from exposure to sunlight and many chemicals. Polyethylene, however, is a material to which adhesives will not bond. Consequently, it heretofore has not been possible to secure a polyethylene tail gate liner to the tail gate adhesively. Instead, it has been the practice to secure the liner to the tail gate by screws which pass through openings formed in the liner and into holes formed in the tail gate. The provision of holes in the tail gate for the accommodation of screws, or for any other reason, is undesirable because of the ability of moisture to enter the tail gate via such openings and result in rusting of the metal from which the tail gate is formed. In many instances the provision of such openings in a vehicle's tail gate will void the vehicle manufacturer's antirust warranty.

A tail gate liner 9 constructed in accordance with the embodiment of the invention shown in FIGS. 1-3 is capable of being secured or bonded to the tail gate adhesively without regard to the material from which the liner is made and without necessitating the formation of openings of any kind in the tail gate. The liner 9 has a continuous recess or groove 13 molded therein along three of its contiguous sides, one of such sides being the side opposite that from which the flange 11 extends. Accommodated in the groove is an attaching member 14 formed of any suitable material to which an adhesive will bond. The member 14 could be formed of metal, wood, fiberglass, or the like, but is it preferred to use polycarbonate because such material has many desirable properties. At suitably spaced intervals the liner 9 is provided with openings 15 in communication with the groove 13 and the attaching member 14 is provided with correspondingly spaced, tapped openings 16. Screws 17 extend through the openings 15 and into the openings 16 to seat and retain the attaching member 14 securely in the groove 13.

The thickness of the attaching member 14 corresponds substantially to the depth of the groove 13 so as to provide an exposed surface 18 that is substantially flush with the adjacent surface of the panel 10. To the exposed surface 18 is applied a layer 19 of adhesive which will bond not only to the attaching member 14, but also to the surface 7 of the tail gate. Any one of a number of adhesives may be used; one suitable adhesive is an acrylic foam manufactured by 3 M Company.

The attaching member 14 normally is installed by the manufacturer of the liner 9 and, when installed, includes the adhesive layer 19. Prior to installation of the liner, the adhesive layer will be covered by a peelable barrier film (not shown) as is conventional.

The embodiment of the invention shown in FIGS. 4 and 5 corresponds substantially to the earlier described embodiment, so corresponding reference characters are used for corresponding parts. The principal difference between the two embodiments is that, in the embodiment of FIGS. 4 and 5, the groove 13 is replaced by a plurality of molded recesses or sockets 20 spaced at intervals around three sides of the panel 10. As shown, each socket 20 is substantially circular in cross section, but it could be noncircular, if desired.

Accommodated in each socket 20 is an attaching member 21 like the attaching member 14, with the exception that the member 21 has a configuration corresponding substantially to that of the socket 20. Each attaching member is retained in its socket 20 by a screw 22 corresponding in all respects to the screws 17, and each attaching member has an exposed surface 23 to which is applied a layer of adhesive 24 like the adhesive 19.

To apply either of the disclosed liners to the tail gate 4, the surface 7 is cleaned and any barrier film that may be applied to the adhesive layers 19 or 24 removed. The liner 10 then may be applied to the tail gate 4 in such manner that the liner surface in which the groove or sockets are formed confronts the surface 7 and so that the flange 11 confronts and bears against the tail gate edge 8. The liner then may be moved toward the tail gate surface 7 so that the adhesive engages the tail gate surface. Sufficient force may be applied on the liner to ensure that the adhesive has full area contact with the tail gate surface 7, thereby resulting in a complete bond between the tail gate and the attaching member or members of the liner.

One advantage of using screws of the kind shown at 17 and 22 is that, if desired, they may be withdrawn, thereby enabling the liner to be removed from the tail gate for any desired purpose. However, if removability of the liner is not required, the screws could be replaced by rivets or any other permanent fasteners.

If desired, the adhesive may be replaced by a separable hook and loop fastener of the kind manufactured and sold under the trademark VELCRO. In this case, of course, the hook or loop strip will be applied to the attaching member and the companion loop or hook strip will be applied to the surface 7 of the tail gate in known manner.

One of the advantages of the continuous attaching member 14 is that it forms a seal around three full sides of the tail gate, thereby inhibiting the entry of dirt and moisture between the liner and the tail gate.

A particularly advantageous characteristic of the invention is that no tools of any kind are required to apply the liner to the tail gate. Thus, application of the liner to the tail gate is quick, easy, and does not require the services of a skilled technician.

The disclosed embodiments are representative of presently preferred forms of the invention, but are intended to be illustrative rather than definitive thereof. The invention is defined in the claims.

We claim:

1. A protective liner adapted for attachment to a device to be protected, said liner comprising a panel adapted to overlie a surface of said device with one surface of said panel confronting said surface of said device, said one surface of said panel having a recess therein; an attaching member carried by said panel and accommodated in said recess in a position to be interposed between said one surface of said panel and said surface of said device; first non-adhesive means securing said attaching member to said panel within said recess; and adhesive second means for adhesively bonding said attaching member to said device without the formation of any openings in said device.

2. The liner according to claim 1 wherein said recess is elongate and said attaching member is correspondingly elongate.

3. The liner according to claim 1 wherein said recess comprises a socket and said attaching member snugly is accommodated in said socket.

4. The liner according to claim 3 wherein said socket is substantially circular in cross section.

5. The liner according to claim 3 wherein said socket is non-circular in cross section.

6. The liner according to claim 1 wherein said panel is formed of a material which is resistant to adhesive bonding between said panel and said adhesive second means.

7. The liner according to claim 6 wherein said first means comprises non-adhesive means.

8. The liner according to claim 6 wherein said first means separably secures said attaching member to said panel.

9. A protective liner and a pickup truck tail gate assembly, said liner comprising a panel corresponding substantially in area and configuration to that of one surface of siad tail gate, said panel overlying said one surface and having one surface thereof confronting said surface of said tail gate; attaching means interposed between the confronting surfaces of said tail gate and said liner; non-adhesive first means securing said attaching means to said liner; and adhesive second means bonding said attaching means to said tail gate without penetrating any surface thereof, said panel being formed of material resistant to adhesive bonding of said attaching means to said panel.

10. The assembly according to claim 9 wherein said panel has a recess therein in which said attaching means is accommodated.

11. The assembly according to claim 10 wherein said recess is elongate and said attaching means is correspondingly elongate.

12. The assembly according to claim 11 wherein said recess comprises a socket and said attaching means snugly is accommodated in said socket.

13. The assembly according to claim 12 wherein said socket is substantially circular in cross section.

14. The assembly according to claim 13 wherein said socket is non-circular in cross section.

15. The assembly according to claim 9 wherein said first means separably secures said attaching member to said panel.

16. The assembly according to claim 9 wherein said attaching means and said tail gate are formed of materials to which said adhesive second means will adhere.

17. The assembly according to claim 9 wherein said panel has a lip extending along one side thereof and overlying an edge of said tail gate.

* * * * *